United States Patent [19]

Meyer et al.

[11] 4,191,819

[45] Mar. 4, 1980

[54] ACTIVATED ANIONIC POLYMERIZATION OF LACTAM WITH PARTIALLY MASKED POLYISOCYANATE

[75] Inventors: Rolf-Volker Meyer; Rolf Dhein; Kurt Schneider; Friedrich Fahnler, all of Krefeld, Fed. Rep. of Germany

[73] Assignee: Bayer Aktiengesellschaft, Leverkusen, Fed. Rep. of Germany

[21] Appl. No.: 823,979

[22] Filed: Aug. 12, 1977

[30] Foreign Application Priority Data

Aug. 17, 1976 [DE] Fed. Rep. of Germany ....... 2637010

[51] Int. Cl.$^2$ ............................................. C08G 69/18
[52] U.S. Cl. .................................. 528/315; 528/312; 528/323; 528/326
[58] Field of Search ........................... 260/78 L, 78 P; 528/315, 312, 326, 323

[56] References Cited

U.S. PATENT DOCUMENTS

| 3,017,391 | 1/1962 | Motlus et al. | 528/315 |
| 3,304,291 | 2/1967 | Dachs et al. | 528/312 |
| 3,621,001 | 11/1971 | Steinhofer et al. | 528/315 |
| 3,790,515 | 2/1974 | Rosenbaum et al. | 528/315 |

FOREIGN PATENT DOCUMENTS 1420241  1/1972  Fed. Rep. of Germany .

Primary Examiner—Harold D. Anderson
Attorney, Agent, or Firm—Connolly and Hutz

[57] ABSTRACT

A process for the activated anionic polymerization of lactams wherein as activator a fluid partially masked aliphatic araliphatic or cycloaliphatic polyisocyanate being masked with 0.5-0.7 equivalents of lactam per equivalent of NCO groups is used.

5 Claims, No Drawings

ACTIVATED ANIONIC POLYMERIZATION OF LACTAM WITH PARTIALLY MASKED POLYISOCYANATE

This invention relates to a process for the preparation of polyamides by activated anionic polymerisation of lactams.

The activated anionic polymerisation of lactams is used in numerous different processes for the manufacture of polyamide shaped products. Trouble-free polymerisation and the quality of the polyamides prepared by the various processes depend not only on the catalyst but to a large extent also on the nature of the activator used.

Numerous compounds have been used as activators for the anionic polymerisation of lactams, e.g. acyl lactams, substituted triazines, carbodiimides, cyanamides, isocyanates and the corresponding masked isocyanate compounds. Either monofunctional or polyfunctional activators may be used. As is well known, polyfunctional activators lead to higher molecular weight, partially cross-linked products.

Polyisocyanates, particularly diisocyanates, are frequently used as activators. Hexamethylene diisocyanate is particularly preferred since it is a highly mobile liquid and as such affords considerable advantages, particularly in continuous processes in which accurate delivery by dosing pumps is important. One serious disadvantage of the use of hexamethylene diisocyanate, however, is its toxicity, which is due to its high vapour pressure (3 Torr at 102° C. 20 Torr at 143° C.) and which necessitates special safety measures to be carried out for each operation. This is especially necessary when an interruption occurs which involves the opening of pumps and feed pipes.

Although hexamethylene biscarbamido caprolactam which has been proposed in German Auslegeschrift No. 1 420 241 is physiologically harmless, it cannot be used in a continuous process because it is crystalline as practically all diisocyanates completely masked with lactams.

The known polyfunctional activators therefore are either quite safe to handle on account of their low vapour pressure but have the disadvantage of being crystalline or they are liquid, in which case they have the disadvantage of being toxic owing to the relatively high vapour pressure of the free diisocyanates.

The use of low viscosity solutions of the crystalline activators in inert solvents is also not advisable in practice because of the relatively large quantities of solvents which are necessary. In most cases more than 100% would be required, which causes holes and blisters in the polymers due to pitting or even foaming.

The use of solvent-free melts has the disadvantage that heated pumps and pipes are required and the activator adducts can be splitted into their components.

The known diisocyanates half masked with lactams, e.g. those described in U.S. Pat. No. 2,698,845, are also crystalline compounds, so that someone skilled in the art would not have expected to find activators which are physiologically harmless, stable in storage and liquid at room temperature among the masked diisocyanates.

It was surprisingly found, however, that numerous polyisocyanates, which are partially masked with 0.5–0.7 equivalents of lactam per equivalent of isocyanate group, are not crystalline at room temperature, have no tendency to split and thus fulfil the necessary requirements.

Additionally completely unexpected these activators also substantially improved the notched impact strength of the resulting polyamides.

The present invention therefore provides an improved process for the production of polyamides by polymerising lactams having at least 5 ring members in the presence of catalysts and activators, the improvement comprises that as activators liquid, partially masked aliphatic, araliphatic and/or cycloaliphatic polyisocyanates which have been masked with 0.5–0.7 equivalents of lactam per equivalent of isocyanate groups, are used.

Owing to their extremely low free diisocyanate content and their low vapour pressure (less than $10^{-2}$ Torr at 100° C., approximately 0.1 Torr at 140° C.), the activators used in the invention process are safe to handle and physiologically less harmful than the known liquid activators. They can also be easily delivered through commercial pumps. The activators do not noticeably react with water at room temperature and in the event of operational breakdown or cleaning they are readily soluble in commonly used cleaning solvents such as isopropanol in spite of the fact that they eventually react with the alcohol.

Suitable polyisocyanates for the preparation of the activators used in the inventive process include aliphatic, araliphatic and cycloaliphatic polyisocyanates containing from 10–12 C-Atoms which may be additionally $C_1$–$C_4$alkyl substituted or aryl substituted, preferably diisocyanates. The preferred diisocyanates are m-xylylene diisocyanate, 2,2,4-trimethylhexamethylene diisocyanate, 2,4,4-trimethylhexamethylene diisocyanate, isophorone diisocyanate and mixtures thereof.

The lactams used for the reaction with the isocyanates are preferably ε-caprolactam and C-alkylcaprolactams having from 1–3 carbon atoms in the alkyl group and mixtures thereof whereas pyrrolidone, piperidone and lauryl lactam result in crystalline or highly viscous adducts.

The activators used in the process according to the invention can be prepared by adding from 0.5–0.7 and preferably 0.5 to 0.6 equivalents of the lactam per equivalent of isocyanate groups to the polyisocyanate already in the reaction vessel at 80–120° C. Small quantities of unreacted free polyisocyanate can easily be removed by thin layer evaporation. The free polyisocyanate content can immediately be determined by thin layer chromatography and is usually below 1%.

The partially masked isocyanates are distinguished by their excellent stability in storage. No splitting of the components into starting materials could be detected after six months storage at room temperature.

The fluidity of the activators used in the inventive process can be greatly improved by the addition of small quantities of viscosity-reducing auxiliary agents such as phthalic acid esters, e.g dimethylphthalate, diethylphthalate, dibutylphthalate or cyclohexenyl cyclohexanone, or lactones such as ε-caprolactone or, preferably, diethylcarbonate which in addition has a slight activator action, or mixtures of the above mentioned substances.

It was completely unexpected to find that the viscosity of the activators according to the invention could be substantially improved by the addition of such small quantities preferably 10–20% by weight, based on the quantity of activator of these viscosity reducing substances, i.e. that the polymerisation process was not disturbed and that no blisters in the polymer were to observe. Among those viscosity reducing auxiliary agents, diethylcarbonate is superior in its effect.

By means of small quantities of the viscosity reducing additives the viscosity of the activators can be adjusted to a value within the range 300-3000 cP, preferably 400-1500 cP (at 20° C.).

The addition of the activators to the lactam melt which is to be polymerised is carried out either continuously or discontinuously at the usual concentrations of preferably 0.1-1 mol %. Any catalysts known for anionic polymerisation of lactams may be used in the usual concentrations preferably alkali metal lactamates or -hydrides such as sodium lactamates, sodium hydride, sodium borohydride or latent catalysts such as alkali metal salts of semi-esters of carbonic acid, of carboxylated amides or decarboxylatable carboxylic acids, e.g. sodium ethyl carbonate.

The activators according to the invention are suitable for the preferably continuous polymerisation of lactams having at least five ring members such as α-pyrrolidone, ε-caprolactam, C-alkyl-substituted caprolactams, lauryllactam or mixtures of the above mentioned lactams.

The activators may be used for the manufacture of semi-finished products by the pressure-free casting method. For this purpose, two separate lactam melts one containing the catalyst and the other the activator are prepared and then introduced into a casting mould immediately after they have been added together and mixed. Polymerisation is normally carried out at temperatures of between 140° C. and 200° C., the polyamide obtained is already shaped in the mould. The activators may also be used in the rotational moulding method for preparing hollow articles in which a polymerisable melt is introduced into a mould rotating about two axes at right angles to each other at such rotational velocities that the resulting centrifugal forces are below the gravity force and polymerisation is initiated by heating.

Other examples or processing techniques in which the inventive activated anionic polymerisation can be used is roll casting and polymerisation in the cylinder of an injection moulding machine or an extruder at temperature of from 180° C. to 300° C., preferably from 230°-290° C.

The process according to the invention is particularly important in the field of rotational moulding for the manufacture of large hollow bodies, wherein the inventive polymerisation is carried out in the presence of polyalkylenglycols—polyethylene glycols having molecular weights of 5000 to 100,000, preferably from 20,000 to 50,000—in order to increase the toughness of the hollow articles.

EXAMPLE 1

(a) Preparation of the activator 210 g (1 mol) of an isomeric mixture of 2,2,4- and 2,4,4-trimethylhexamethylene diisocyanate were introduced into a reaction vessel at 110-120° C. under a nitrogen atmosphere. 122.6 g (1.1 mol) of ε-caprolactam were added portionwise under stirring and at such a rate that the temperature was maintained without further heating. Stirring was continued for one hour at 100° C. and any residues of unreacted diisocyanate were removed by means of a thin layer evaporator (180° C., 0.1 Torr). The activator thereby obtained had a free diisocyanate content of less than 0.5%, determined by thin layer chromatography. The dynamic viscosity was 1500 cp (20° C.).

| Activator | Vapour pressure at 120° C. | 150° C. |
|---|---|---|
| Hexamethylene diisocyanate | 7.0 Torr | 26.0 Torr |
| Trimethylhexamethylene diisocyanate | 2.5 Torr | 11.0 Torr |
| Activator according to Example 1 a) | $<10^{-2}$ Torr | 0.1 Torr |

The above Table shows the low volatility of the partially masked activator.

(b) Reactivity of the activator to water and alcohols

From 20-30 parts by weight of water, methanol or isopropanol were added to 10 parts by weight of an activator prepared as in Example 1 (a) and the mixture was stored at room temperature. The mixture obtained by the addition of water was a diphasic system from which no precipitates due to reaction of the isocyanate groups with water were obtained even after constant stirring for 30 days. The addition of alcohols to the activator resulted in the formation of urethanes, as is to be expected. In this case, only half the original isocyanate concentration could be measured after 30 hours at room temperature and only one quarter of the original isocyanate concentration after 100 hours at room temperature. However, the urethanes were so readily soluble that only a small increase in viscosity was found even after 60 days.

Comparison Experiment A

Water and alcohols were added to 10 parts by weight of hexamethylene diisocyanate as described in Example 1 (b) and the mixtures were stored.

In the diphasic system obtained by the addition of water, after one day insoluble constituents had formed and their proportion was so high after 3 days, that dosing had become impossible.

When methanol was added, crystallisation started 6 hours and was virtually completed after 12 hours.

The addition of isopropanol resulted in a much slower increase in viscosity than the addition of methanol but after 10 days, the mixture had solidified to a vitreous mass.

Comparison Experiment B

Water and alcohols were added to 10 parts by weight of isophorone diisocyanate as in Example 1 (b).

After some delay, the undesirable effects described in Comparison Experiment A were observed in all cases.

(c) Polymerisation 97.6 parts by weight of ε-caprolactam were evenly divided among two containers. One half was mixed with 1.6 parts by weight of a solid 80% solution of sodium caprolactamate in caprolactam and the other half with 0.9 parts by weight of the activator described in Example 1 and both mixtures were melted at 120° C. under nitrogen. The two melts were combined in proportions of 1:1 in a mixing head by means of dosing pumps and fed into a rotary tool measuring 300×200×180 mm which had been heated to 180° C. The supply was stopped when 1600 g of reactive lactam melts had been fed in. Biaxial rotational moulding at a rate of 25 revs. per min. about the primary axis and 10 revs. per min. about the secondary axis resulted in the production of a hollow polyamide body having a wall thickness of 4 mm. Polymerisation was completed after 3 minutes and the hollow body was removed after a cooling time of 1 minute in air.

All the hollow bodies were stored for 24 hours under standard atmospheric conditions (23° C., 50% relative humidity). Test samples in the form of small standard rods measuring 4 mm×50 mm×6 mm were cut out of the walls of the hollow bodies. These samples were used to determine the impact strength in the cold according to DIN 53453. Before these tests were carried out, the rods were cooled to −15° C. for 16 hours.

The data characterising the polymerisation process and the values obtained for the impact strength were summarised in Table 1.

EXAMPLE 2

(a) Preparation of the activator 222 g (1 mol) of isophorone diisocyanate were introduced into a reaction vessel at 110°–120° C. under an atmosphere of nitrogen. 122.6 g (1.1 mol) of ε-caprolactam were added as described in Example 1 (a) and residues of unreacted diisocyanate were removed after the reaction. The proportion of free diisocyanates under these conditions was less than 0.5%. The dynamic viscosity of the product was found to be above 50,000 cP (20° C.). The activator prepared in this way was distinguished by its low volatility. It had a vapour pressure of $10^{-2}$ Torr at 120° C. and 0.1 Torr at 150° C.

(b) Improvement of the fluidity of the activator 100 g of the activator described in Example 2 (a) and 10–30 g of diethylcarbonate were homogenously mixed in a stirrer vessel at 80° C. The viscosities of the resulting products in dependence upon the proportion of diethylcarbonate at 20° C. were as follows:

| Addition of diethyl carbonate | Dynamic viscosity (cP) |
|---|---|
| 10% | 10,500 |
| 15 | 1,700 |
| 20 | 400 |
| 25 | 130 |
| 30 | 65 |

(c) Polymerisation 97.6 parts by weight of ε-caprolactam, 1.6 parts by weight of a solid 80% solution of sodium caprolactamate in caprolactam and 0.8 parts by weight of the activator prepared according to Example 2 (a) were polymerised to form hollow bodies as described in Example 1 (c). The data determined on the polymer as described in Example 1 (c) are shown in Table 1.

(d) Polymerisation

Example 2 (c) was repeated except that in this case 0.9 parts by weight of activator which had been improved in its fluidity by the addition of 15% diethylcarbonate according to Example 2 (b) were used. The polymerisation data and the values obtained for impact strength are set forth entered in Table 1.

(e) Polymerisation

Example 2 (d) was repeated except that in this case 1% of a polyethylene glycol having an average molecular weight of about 20,000 was also added in order to increase the impact strength. The polymerisation data and values for impact strength of the polyamide are given in Table 1.

Comparison Experiment C

The procedure was analogous to that of Example 1 (c) but in this case 0.4 part by weight of hexamethylene diisocyanate was used as activator. The data characterising the polymerisation process and the values obtained for impact strength are shown for comparison in Table 1.

Table 1

Summary of the polymerisation data and values for impact strength at −15° C. (DIN 53453) of polyamides obtained in the preceding examples and Comparison Experiment C.

| Example | 1(c) | 2(c) | 2(d) | 2(e) | Comparison Experiment C |
|---|---|---|---|---|---|
| $T_i$** | 8'10" | 7'50" | 7'00" | 7'20" | 6'50" |
| Monomer content | 3.9% | 4.8% | 3.3% | 4.0% | 3.5% |
| ηrel* | 10.8 | 15.1 | 9.5 | 10.5 | 8.1 |
| $a_n$[KJ/m²] (external surface) | 49.0 | 44.5 | 43.0 2x not broken | 64 9x not broken | 32 |
| $a_n$[KJ/M²] (internal surface) | 84 1x not broken | 64 | 54 2x not broken | 73 5x not broken | 36 |

*of a 1% solution in m-cresol at 25° C. previosly dissolved at 120° C.
**For comparision of the polymerisation times (ti) determined on 100 g of control tests.
$a_n$ = impact strength according to DIN 53453 at −15° C.

What we claim is:

1. In a process for the preparation of a moldable polyamide by polymerizing a lactam having at least 5 ring members in the presence of a catalyst and an activator, the improvement wherein the activator is at least one fluid, partially masked polyisocyanate selected from the group consisting of aliphatic polyisocyanate, araliphatic polyisocyanate and cycloaliphatic polyisocyanate, said polyisocyanate being masked with 0.5–0.7 equivalents of lactam per equivalent of NCO.

2. A process as claimed in claim 1, wherein the polyisocyanate is partially masked with ε-caprolactam or a C-alkyl caprolactam.

3. A process as claimed in claim 1, wherein the polyisocyanate is masked with 0.5 to 0.6 equivalents of lactam per equivalent of NCO.

4. A process as claimed in claim 1 wherein the polyisocyanate of said partially masked polyisocyanate has from 10 to 12 carbon atoms.

5. A process as claimed in claim 4, wherein the polyisocyanate of said partially masked polyisocyanate is 2,2,4-trimethyl-hexamethylene diisocyanate, 2,4,4-trimethyl-hexamethylene diisocyanate, isophorone diisocyanate or a mixture thereof.

* * * * *